S. S. MORTON.
TRACTION ENGINE.
APPLICATION FILED AUG. 2, 1910. RENEWED JUNE 19, 1914.

1,104,537.

Patented July 21, 1914.

5 SHEETS—SHEET 4.

WITNESSES:
J. A. Brophy
J. P. Davis

INVENTOR
Samuel S. Morton
BY Munn & Co
ATTORNEYS

S. S. MORTON.
TRACTION ENGINE.
APPLICATION FILED AUG. 2, 1910. RENEWED JUNE 19, 1914.

1,104,537.

Patented July 21, 1914.

5 SHEETS—SHEET 5.

WITNESSES:
J. H. Brophy
J. P. Davis

INVENTOR
Samuel S. Morton
BY Munn & Co
ATTORNEYS

UNITED STATES PATENT OFFICE.

SAMUEL S. MORTON, OF UPPER SANDUSKY, OHIO, ASSIGNOR, BY MESNE ASSIGNMENTS, TO THE HERR ENGINE COMPANY, OF PORTSMOUTH, OHIO.

TRACTION-ENGINE.

1,104,537.  Specification of Letters Patent.  Patented July 21, 1914.

Application filed August 2, 1910, Serial No. 575,075. Renewed June 19, 1914. Serial No. 846,216.

*To all whom it may concern:*

Be it known that I, SAMUEL S. MORTON, a citizen of the United States, and a resident of Upper Sandusky, in the county of Wyandot and State of Ohio, have invented a new and Improved Traction-Engine, of which the following is a full, clear, and exact description.

My invention relates to traction engines such as are used for agricultural and other purposes.

The object of my invention is to so construct the tractor that the power will be distributed evenly to the driving wheels and that simplicity of operation will be obtained with a construction that is strong, yet flexible as regards accommodating itself to inequalities of the ground.

The invention will be fully described hereinafter with reference to the accompanying drawings, which represent one form of my improved tractor, and the novel features will be pointed out in the appended claims.

Figure 1:
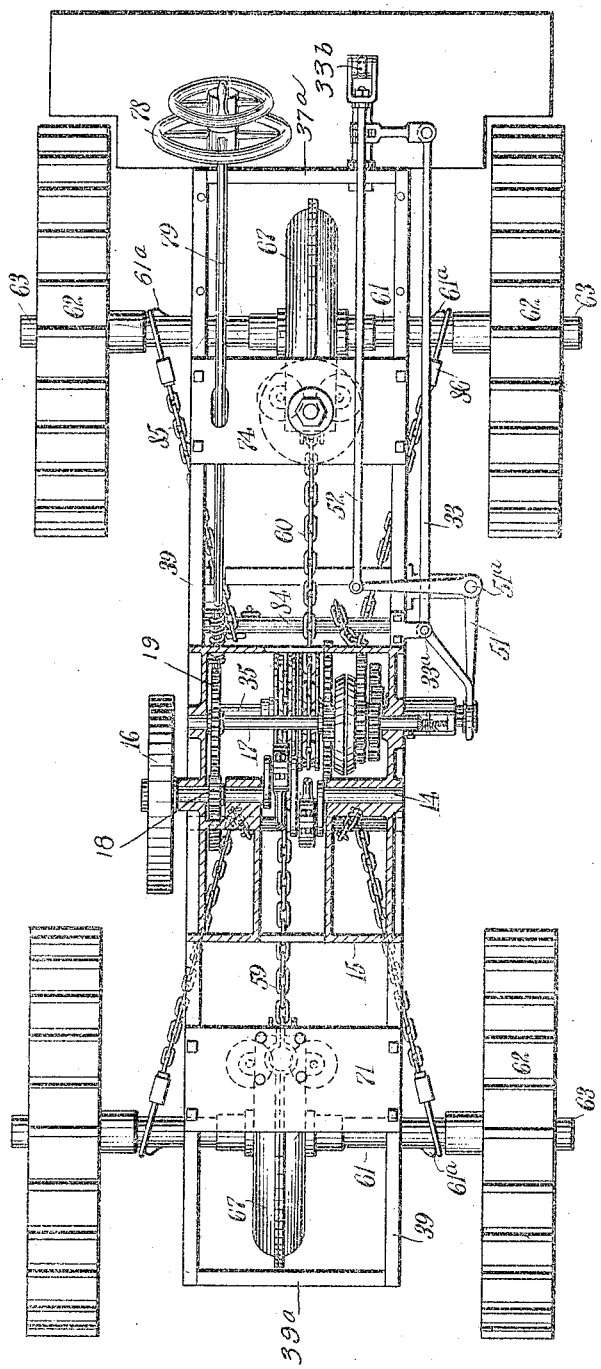
Figure 2:
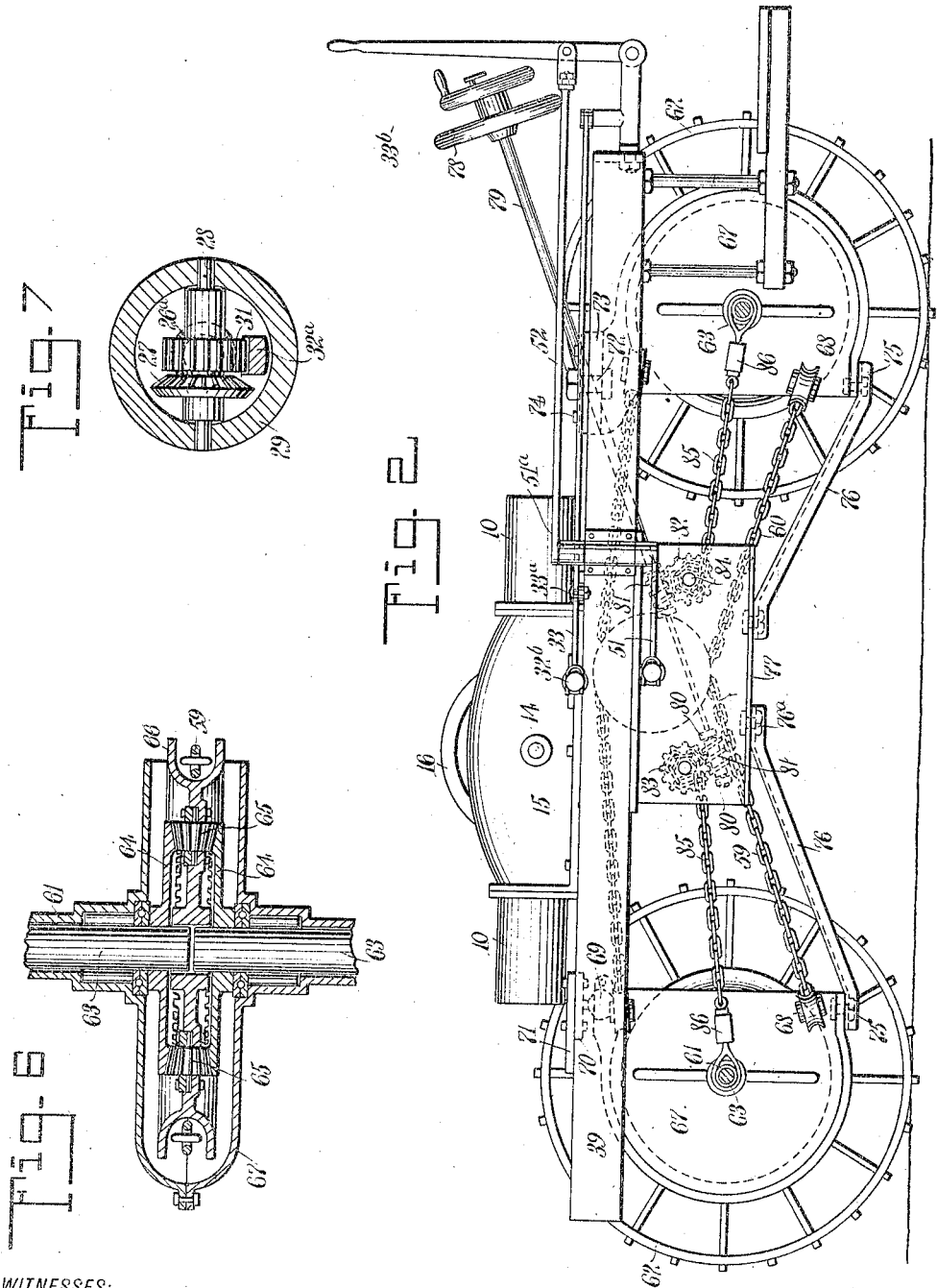
Figure 3:
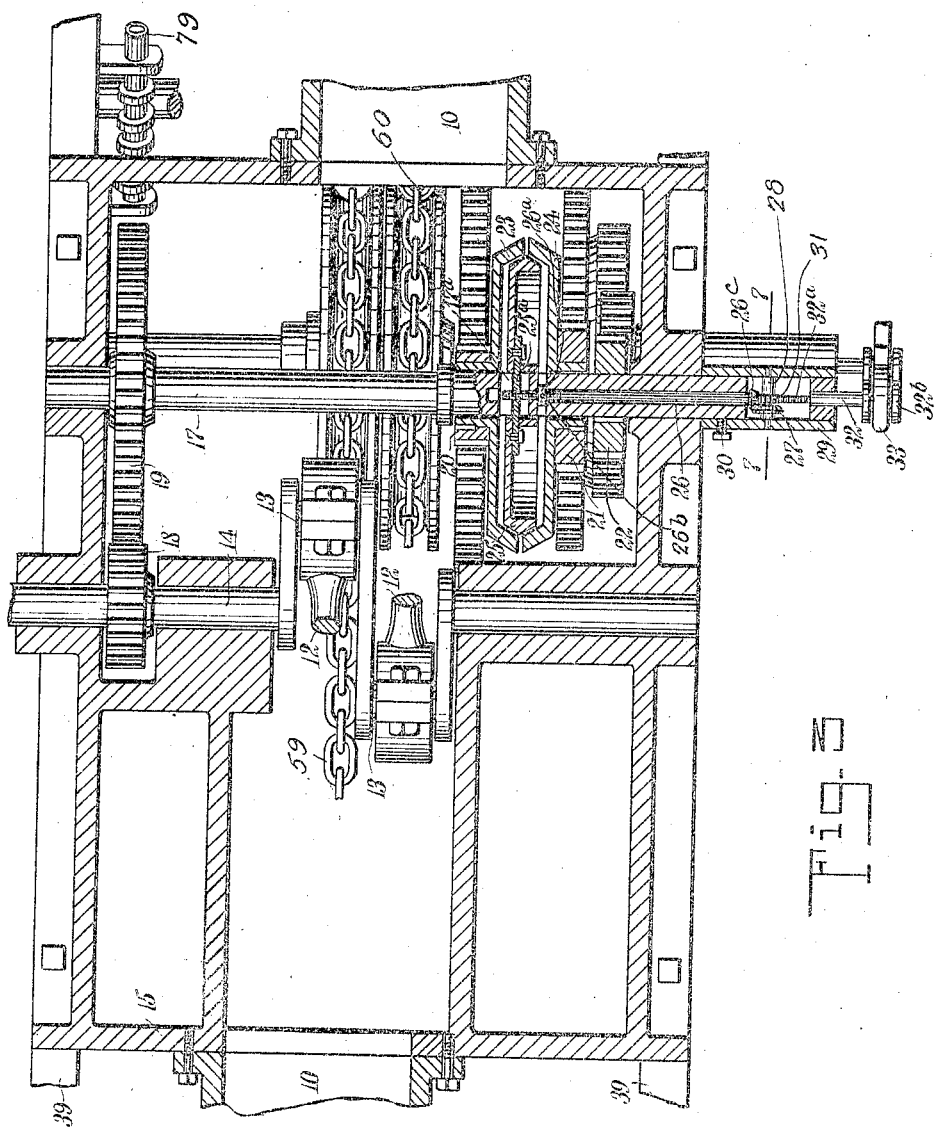
Figure 4:
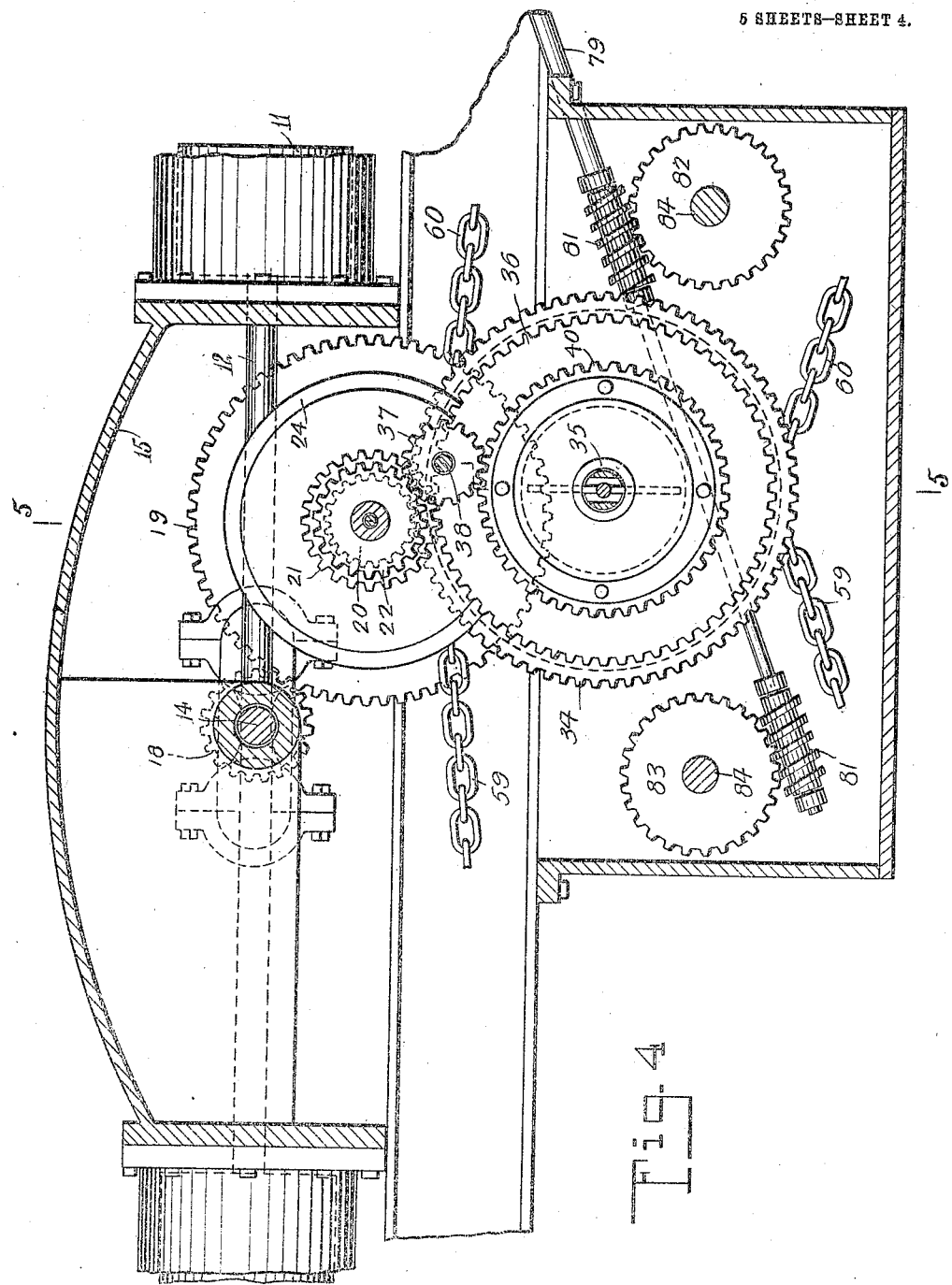
Figure 5:
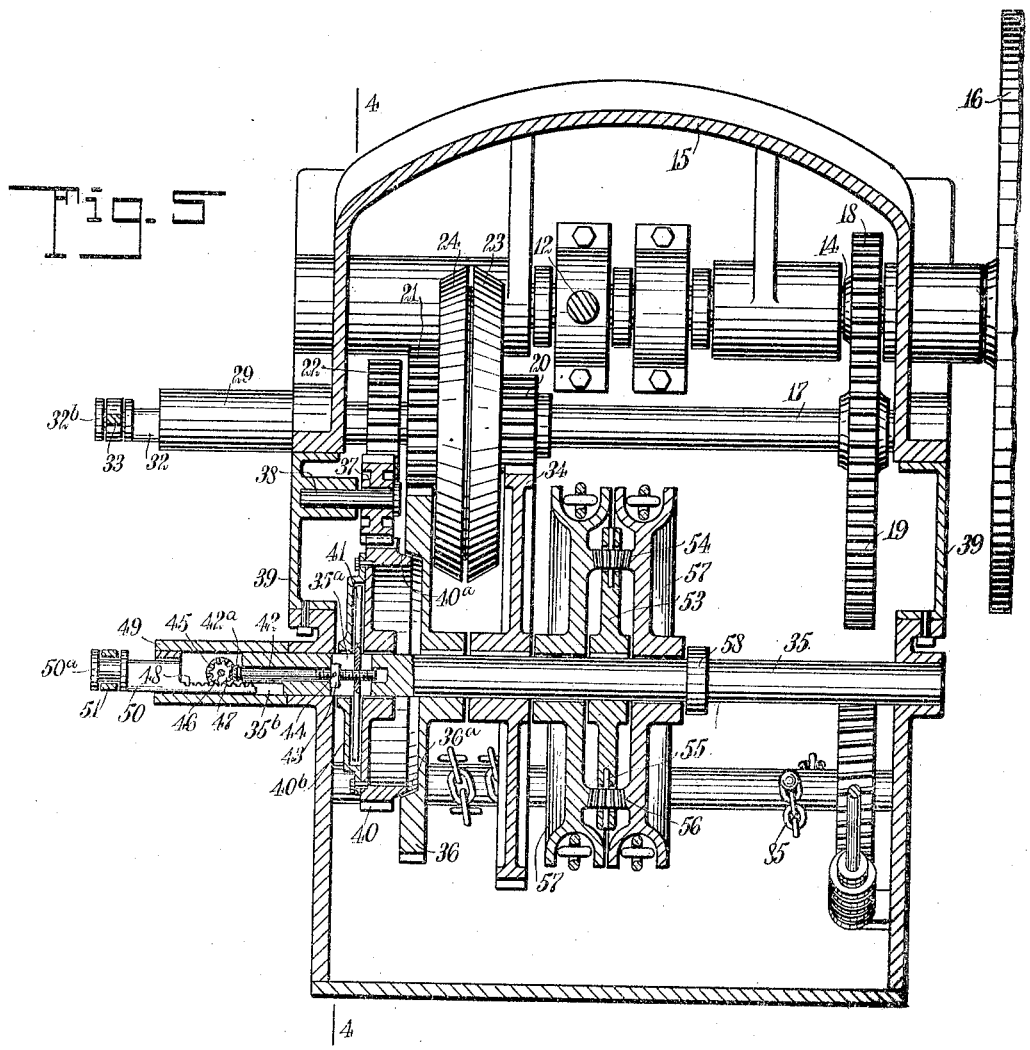

In the drawings, Figure 1 is a plan view of the tractor, with parts in section; Fig. 2 is a side elevation of the machine; Fig. 3 is a horizontal section on an enlarged scale, showing the drive shaft and the gearing connected with it; Fig. 4 is a vertical section on the line 4—4 of Fig. 5; Fig. 5 is a vertical cross section, on the line 5—5 of Fig. 4; Fig. 6 is a detail horizontal section of the differential gear on the axle; and Fig. 7 is a vertical section on the line 7—7 of Fig. 3, showing a detail of the speed-changing mechanism.

The engine proper may be of any suitable construction. I have shown two opposed horizontal cylinders 10, set slightly out of line, as may be seen in Fig. 3, and containing pistons, such as 11, which, by means of rods 12, are connected with opposed cranks 13 on the main shaft or drive shaft 14, journaled in the crank case 15 and preferably carrying a fly wheel 16. When the engine is a high-speed engine (as the one shown in the drawings is supposed to be), a countershaft 17 is driven from the main shaft 14 at a reduced rate of speed, by means of a pinion 18 meshing with a gear wheel 19, each of said wheels being rigid upon its shaft. On the countershaft 17 are mounted loosely the pinions 20 and 21, and rigidly the pinion 22. Rigidly connected with the pinions 20 and 21 are clutch disks 23 and 24 respectively, between which is located the driving clutch member 25, held to rotate with the shaft 17 but capable of being shifted lengthwise thereof to engage either one of the clutch disks 23 and 24.

The particular mechanism for shifting the clutch member 25, shown in the drawings, particularly Figs. 1, 3 and 7, is constructed as follows: The shaft 17 has a longitudinal slot 17ª, through which extends a bar 25ª secured rigidly to the clutch member 25. The bar has a central threaded opening into which fits the adjusting screw-rod 26, located in an axial recess of the shaft 17 and capable of turning relatively thereto, although under normal condition the shaft 17 and the rod 26 rotate in unison. Longitudinal displacement of the rod relatively to the shaft is prevented in any suitable manner, as by a nut 26ª at the inner portion of the rod and a pin 26ᵇ passing through the nut and rod. At the outer end of the rod 26 is a bevel wheel 26ᶜ, in mesh with another bevel wheel 27 carried by a short transverse shaft 28 journaled in a sleeve 29 which is compelled, as by a set screw 30, to rotate with the shaft 17. On the shaft 28 is also secured rigidly a pinion 31, in mesh with a rack 32ª carried by a slide 32, which is movable lengthwise of the shaft 17 in the sleeve 29, but held to rotate with said sleeve, the rack sliding in a groove of the shaft. To shift the rack, the outer end of the slide has a grooved collar 32ᵇ, engaged by the forked end of a shifting lever 33, fulcrumed at 33ª and operated by means of a suitable hand lever 33ᵇ. The pinion 31 is of greater diameter than the bevel wheel 26ᶜ, so that the latter will not interfere with the movement of the rack. In the central or neutral position (Fig. 3), the clutch member 25 rotates idly, so that the tractor or truck will stand still while the motor (generally a gasolene engine) is running. The pinion 20 is in mesh with a gear wheel 34, keyed on the transmission shaft 35, and similarly the pinion 21 is in mesh with another gear wheel 36, likewise keyed on the shaft 35. The pitch ratios of these two sets of gears are different, so that one of them (for instance 21, 36) will operate the transmission shaft 35 at a higher rate of speed than the other (20, 34). Therefore, according to the engagement of the clutch member 25 with either the clutch disk 24 or the clutch disk 23, the high gear or the low gear will be in operation. The pinion 22, fast on the shaft 17, is in mesh with the pinion 37, mounted on a stud 38 secured to one of the longitudinal channel beams 39 which are connected together at their ends by transverse beams 39ª to form a rigid frame having at its center of length a crank case 15. The pinion 37 meshes with a toothed wheel 40, which is loose upon the transmission shaft 35, and also capable of sliding lengthwise thereof; this wheel is provided with a clutch face 40ª, adapted for engagement with a clutch face 36ª on the gear wheel 36. The teeth of the wheels 37, 40 are so constructed as to remain in engagement notwithstanding the longitudinal movement of the wheel 40. When the clutch faces 36ª, 40ª are in engagement, the shaft 35 will be rotated in the direction opposite to that in which it rotates under the influence either of the high gear 21, 36 or of the low gear 20, 34; the wheels 22, 37, 40, with clutch faces 40ª and 36ª, constitute a reverse gear.

The mechanism for shifting the gear 40 is similar to that described in connection with the clutch member 25. The shaft 35 has a slot 35ª through which passes a bar 41, threaded at its center to receive the screw rod 42. A nut 43, together with a pin 44, prevents the rod 42 from sliding lengthwise in the shaft 35 in which said rod extends axially. The wheel 40 is made with a plate 40ᵇ, forming a chamber in which the bar 41 is located, so that the shaft 35 and the bar 41 may, during the forward travel of the vehicle, turn without affecting the wheel 40. The rod 42 normally rotates with the shaft 35 and carries a bevel wheel 42ª in mesh with a bevel wheel 45 on a short transverse shaft 46. The shaft 46 also carries a pinion 47, larger in diameter than the bevel wheel 42ª, and in mesh with a rack 48 which slides in a longitudinal groove 35ᵇ of the shaft 35 and in a sleeve 49. The rack is connected with a slide 50 having at its outer end a collar 50ª, engaged by the fork of an elbow lever 51 fulcrumed at 51ª and connected with the operating or shifting lever 33ᵇ, by means of a rod 52. Lateral movement of the controller 33ᵇ governs the forward gears, while longitudinal movement of the controller operates the reversing mechanism. On the shaft 35 is secured rigidly a disk 53, on which pinions 54 are mounted to turn about radial axes 55. These pinions mesh with toothed rings 56, on transmission wheels 57 which are mounted on the shaft loosely and held against longitudinal movement by a collar 58, the disk 53 and the gear wheel 34. One of the wheels 57 drives the front axle, as by means of a chain 59, while the other wheel 57 drives the rear axle, by means of a chain 60. It will be understood that the disk 53, pinions 54 and wheels 57 constitute a differential gearing by which the power is apportioned differently to the front wheels and the rear wheels, according as one set or the other happens to require more power.

The axle 61 and ground wheels 62 are alike front and rear, and may be of any suitable construction. As shown in Fig. 6, the axle 61 consists of two alined shafts 63 (to which the respective ground wheels are secured rigidly), connected by differential gearing of the well-known character. Thus each of the shafts 63 (journaled by means of balls and rollers) may carry rigidly a toothed disk 64, in mesh with pinions 65, journaled to turn about radial axes on the chain wheel 66, which is loose relatively to both shafts. Each axle is connected rigidly with a differential gear case 67, and within such case are journaled guide pulleys 68, serving to keep the chains 59 and 60 in proper contact with the wheels 66 when the axles are swung for steering. The axles are connected with the frame loosely, as follows: The gear case or carrier 67 of the front axle is formed in two sections, bolted together and each provided at the top with a recess to form a cup or socket for the reception of a ball 69. The stem of the ball is provided with a plate 70, bolted to the center of a cross plate 71, which is secured to the longitudinal beams 39 of the frame. The ball and socket form a universal joint, which allows the front axle to be turned for steering and also gives it transverse mobility (about a longitudinal horizontal axis), to accommodate itself to uneven ground, and up and down mobility (about a transverse horizontal axis), to keep the chain 59 taut and enable the front wheels to ride more easily over obstacles. The gear case 67 of the rear axle is connected with the frame, not by a universal joint, but by a pivot 72, allowing the gear case to move in one plane relatively to the frame (which plane is normally horizontal). Preferably, the rear gear case is made with a plate 73, mounted to swing on the pivot 72 mounted at the center of the cross plate 74 secured to the side channel beams 39 of the frame. Bearing balls (not shown) may be interposed between said plate 73 and the cross plate 74. Each of the differential gear cases 67 has a pivot 75 for connection with a rod 76, the other end of which is pivoted at 76ª to a gear case 77, secured to the under side of the beams 39. The pivot 75 is in line with the pivot 72 or 69 respectively, and the centers of the guide wheels 68 are placed in this same line, which is located inwardly of the axle (that is, nearer the center of the truck), so as to keep the chains 59, 60 taut as the axles are swung for steering. By the employment of sectional axles and mounting the gear casings in which the ends of the sections of the axles are journaled at the longitudinal center of the rigid frame, the strain of the driving wheels from contact with uneven or rough ground or for any other cause, is prevented from being communicated to the frame and the frame thereby relieved of all torsional strain. This construction also relieves the several bearings of strain. By arranging the engine at center of the frame, between the front and rear wheels, the weight is equally distributed upon the four wheels.

The steering mechanism comprises a steering wheel 78 on a shaft 79, journaled in brackets 80 of the gear case 77 and provided with worms 81, one of which engages the upper portion of a worm-wheel 82 and the other the lower portion of a worm-wheel 83. These worm-wheels are mounted on shafts 84, and to each shaft are secured the inner ends of two chains 85, their outer ends being secured to eyes 86 embracing the axles 61 near their outer ends, projections 61ª serving to prevent the eyes 86 from slipping inward. During steering, one of the chains 85 of each axle will be pulled inward to turn the axle, while the other chain will be hauled in so as to prevent it from becoming slack; when steering in the opposite direction, the functions of the chains will be reversed. In cases where the motor is not a high speed motor, the speed-reduction gear 18, 19 may be omitted, that is to say, the shaft 17 may be the crank shaft of the motor. A canvas apron (not shown) may be provided to exclude dust and catch dripping oil, etc.

Various modifications may be made without departing from the nature of my invention as set forth in the appended claims.

Having thus described my invention, I claim as new and desire to secure by Letters Patent:

1. A motor vehicle, comprising a rigid frame, front and rear axles each formed of two sections, ground wheels on the axles, gear casings in which the inner ends of the sections of the axles are mounted, means for pivoting each gear casing to the frame substantially at the longitudinal center thereof, said pivoting means being offset toward the center of the frame, differential gearing in each gear casing and connecting the sections of the axle, each differential gearing including a chain wheel, a transmission shaft mounted in the frame between the axles, high and low speed gearing for operating the transmission shaft, differential gearing on the transmission shaft and including two chain wheels, chains passing around the chain wheels of the transmission shaft and the axles, and a reversing mechanism for said transmission shaft.

2. A motor vehicle, comprising a rigid frame, front and rear axles each formed of two sections, ground wheels on the axles, gear casings in which the inner ends of the sections of the axles are mounted, means for pivoting each gear casing to the frame out of line with the axle and substantially at the longitudinal center of the frame, differential gearing in each gear casing and connecting the sections of the axle, each differential gearing including a chain wheel, a transmission shaft mounted in the frame between the axles, differential gearing on the transmission shaft and including two chain wheels, and chains passing around the chain wheels of the transmission shaft and axles.

3. In a motor vehicle, a rigid frame having a depending member intermediate of its ends, front and rear axles, ground wheels on the axles, centrally arranged gear casings in which the axles are mounted, gearing in the casings for operating the axles, a ball and socket joint between the frame and the gear casing of the front axle, said ball and socket joint being in rear of said axle, a king bolt connection between the frame and the gear casing of the rear axle, said king bolt being in front of said axle, rods having one end pivoted to the lower portions of the gear casings and their other ends pivoted to the center of the depending member of the frame, a transmission shaft, and means for operating the gearings of the gear casings from the transmission shaft.

In testimony whereof I have signed my name to this specification in the presence of two subscribing witnesses.

SAMUEL S. MORTON.

Witnesses:
W. A. GOSSARD,
GEO. NELSON.